Nov. 25, 1930.   C. VAN ALLEN   1,782,639
BARBECUING MACHINE
Filed Nov. 25, 1929
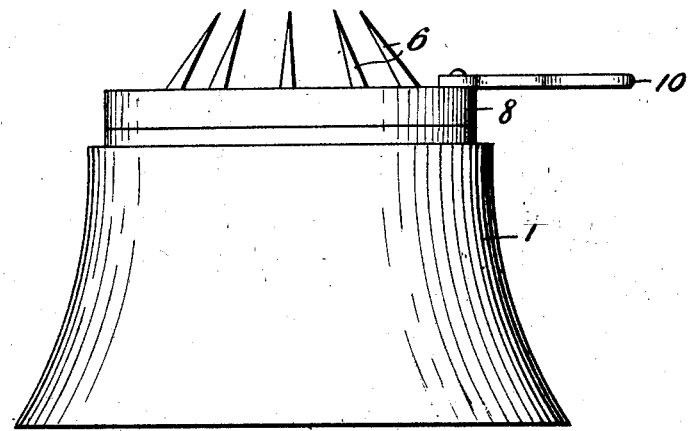
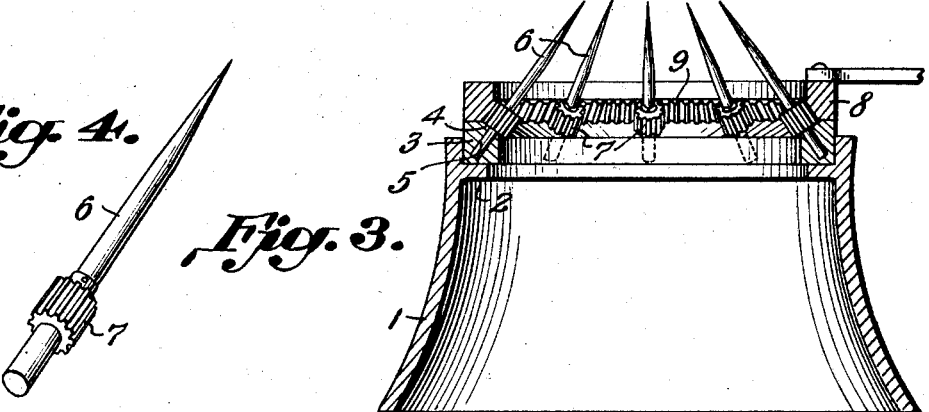
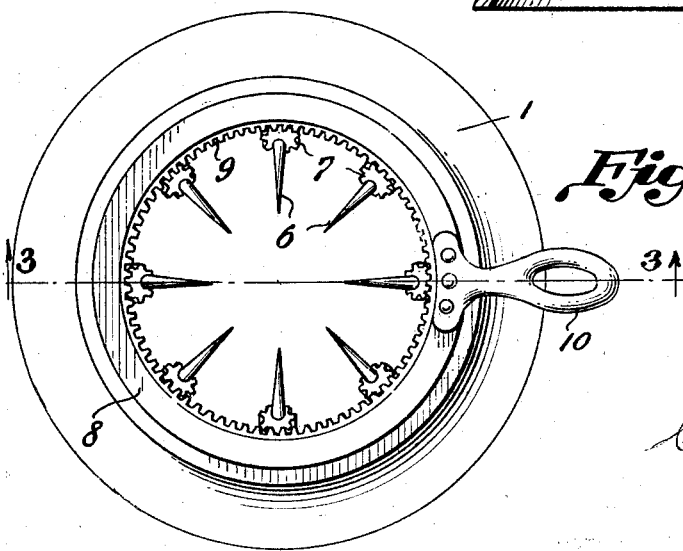

Patented Nov. 25, 1930

1,782,639

UNITED STATES PATENT OFFICE

CLIFFORD VAN ALLEN, OF CANTON, OHIO

BARBECUING MACHINE

Application filed November 25, 1929. Serial No. 409,727.

The invention relates to improvements in barbecuing machines in which spits are set movably in upwardly and inwardly inclined recesses in an annular member supported on a circular base; the spits projecting upwardly and inwardly toward a common point, and the spits can be rotated by a superimposed ring shaped member with means on the inner side thereof engaging the spits; and the objects of improvement are to barbecue meat by impaling same on the spits, placing the machine over a fire, and rotating spits when necessary during process of cooking.

The invention is illustrated in the accompanying drawing, in which Figure 1 shows side elevation view of the machine; Figure 2, plan view of the machine; Figure 3, cross section of the device shown in Figure 1; and Figure 4, perspective view of a spit.

Numeral 1 indicates a hollow base having an annular inwardly extending flange 2 situated below the upper edge of said base to form a recess. Set in this recess and supported by said flange is an annular member 3. The upper inner surface of the member 3 is beveled to form an upward and outwardly inclined surface 4. A series of holes 5 are formed circumferentially in and perpendicular to said inclined surface. Spits 6 are rotatably set in said holes. These spits are provided with integral pinions 7 which rest upon inclined surface 4. Annular member 3 supports a ring 8. The lower internal part of ring 8 is provided with an integral set of gear teeth 9. The plane of these teeth is perpendicular to inclined surface 4 and said teeth mesh with pinions 7. Ring 8 is provided with a handle 10 for rotating said ring. The rotation of ring 8 causes spits 6 to rotate due to the meshing of teeth with pinions 7.

I claim:

The combination in a barbecuing machine, of an annular base provided with an annular supporting surface at its upper end, an annular member provided with a series of equally spaced upwardly and inwardly inclined recesses, said annular member being non-rotatably supported by said supporting surface, a plurality of spits one of which is supported in each of said recesses whereby the spits project upwardly and inwardly toward a common point, a ring shaped member rotatably supported on said annular member, and means on said spits engaging said ring shaped member whereby said spits are rotated when said ring shaped member is rotated.

CLIFFORD VAN ALLEN.